Aug. 13, 1946. W. H. RODEFELD 2,405,755
HAY GATHERER
Filed Jan. 5, 1945
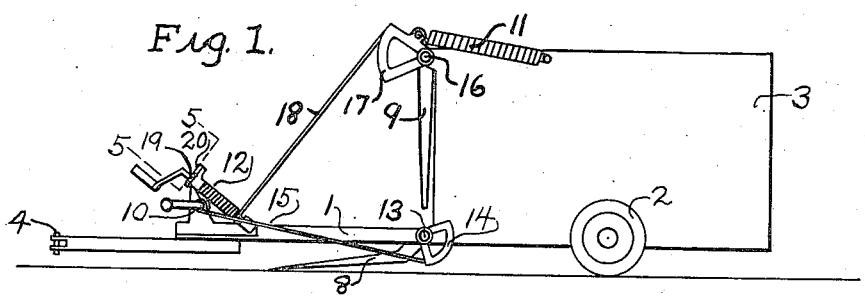
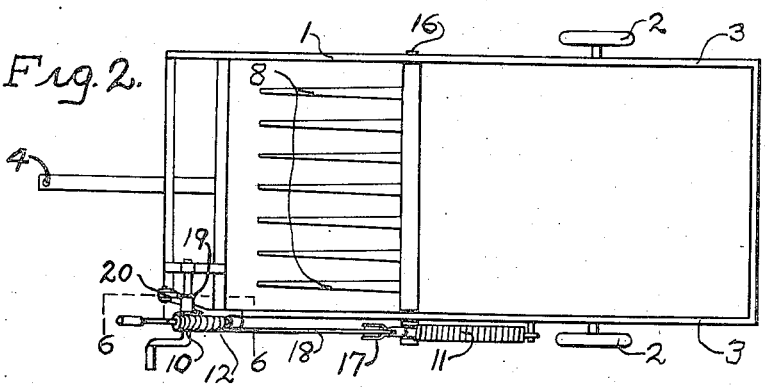
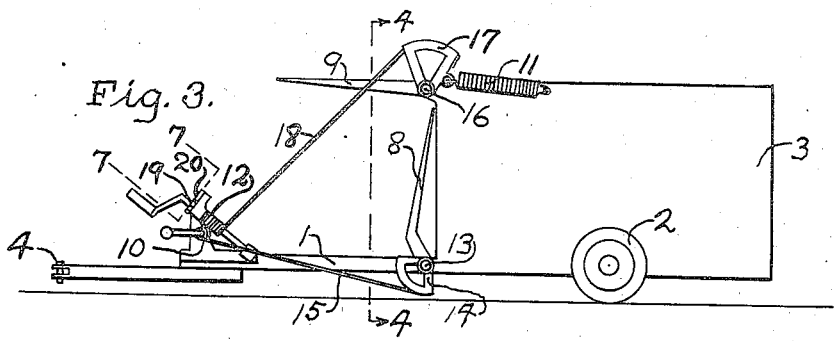
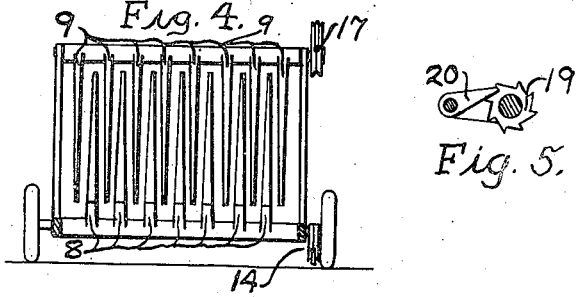
Inventor
William H. Rodefeld.

Patented Aug. 13, 1946 2,405,755

UNITED STATES PATENT OFFICE 2,405,755

HAY GATHERER

William H. Rodefeld, Richmond, Ind.

Application January 5, 1945, Serial No. 571,396

1 Claim. (Cl. 214—78)

My present invention relates to machinery for handling hay and similar material.

The principal object of this invention is the provision of a machine combining loading and holding mechanism with a conveyance to provide means for more efficient work.

A further object is to provide a machine to transport hay and similar material with which there is no need for the use of hand tools or separate machinery for loading.

A further object is to provide a machine for transporting such material with which there is no need for a man to work on the load while loading.

I attain these objects by mechanism illustrated in the accompanying drawing, in which—

Figure 1 is a side view showing a two wheeled conveyance with a tongue and a coupling pin to connect to a tractor and with a set of loading teeth extending forward with their points resting on the ground so that as the machine is pulled forward the teeth pick up the hay or similar material.

Figure 2 is a top view.

Figure 3 is a side view and shows the teeth raised to put material into the conveyance.

Figure 4 is a vertical sectional view taken on the line 4—4 of Figure 3 looking from the front of the conveyance and shows the teeth raised and shows a set of holding arms that swing down against the material and are spaced to pass between the teeth to hold the material when the teeth are returned to the ground to take up additional material. In this view the holding arms are shown in down position. When the teeth are again raised with more material the holding arms are swung upward out of the way of the material carried by the teeth and as soon as the teeth are raised the holding arms are again swung down to holding position.

Figure 5 is an enlarged section taken on lines 5—5 of Figure 1 and 6—6 of Figure 2 and 7—7 of Figure 3 and shows a locking mechanism for holding the loading teeth and the holding arms in desired position.

Similar numerals refer to similar parts throughout the several views.

The frame 1, the wheels 2, and the upright sides 3 constitute the conveyance. The coupling pin 4 is for coupling to a tractor. While the machine shown is for use with a tractor it could be made suitable for horse drawn use by installing a tongue truck to support the front end.

The loading teeth 8 scoop up material as the machine is pulled forward. When a quantity of material has been taken up by the teeth 8 the said teeth are then raised to put the material into the conveyance.

The loading teeth 8 are carried by a shaft 13 on which is a grooved quadrant 14 which is connected by a cable 15 to a hand winch 10 whereby the loading teeth 8 are raised.

A set of holding arms 9 are carried by a shaft 16 to which is secured a grooved quadrant 17 which is connected by a cable 18 to a hand winch 12 to lower the holding arms 9 to the position shown in Figures 1 and 4. The holding arms are raised to the position shown in Figure 3 by a spring 11. While the holding arms 9 are in raised position as shown in Figure 3 the loading teeth 8 carrying material are raised to the position shown in Figure 3 by the hand winch 10. The hand winch 10 is then locked by the ratchet wheel 19 and the pawl 20 shown in Figure 5. The hand winch 12 is then operated to lower the holding arms 9 to the position shown in Figures 1 and 4 and then also locked by a ratchet wheel 19 and a pawl 20. The lock on the hand winch 10 is then released and the loading teeth 8 return to the ground.

The holding arms 9 remain down to hold material in the conveyance while the machine is moved forward to take up more material with the loading teeth 8. When the loading teeth 8 are again to be raised the holding arms 9 are released to swing upward out of the way of the incoming material and are then again lowered against the material before the loading teeth 8 are returned to the ground.

The loading teeth 8 and the holding arms 9 force the material back in the conveyance and when the conveyance is full the loading teeth 8 are locked in raised position and the holding arms 9 are locked in lowered position and the load is thus held on the conveyance while being transported.

Having now shown and described the invention, what I claim and desire to secure by Letters Patent of the United States is:

A machine to take up and transport hay and similar material consisting of a wheeled chassis with a carrying compartment, a set of tines hinged to the chassis and extending forward and in close proximity to the ground to pass under material on the ground as the machine moves forward, means to swing the said tines upward to elevate material thereon to the carrying compartment, a set of arms arranged to swing against the material to hold it in the carrying compartment and means whereby the said tines and the said arms compress the said material in the said carrying compartment.

WILLIAM H. RODEFELD.